(12) United States Patent
Kendig

(10) Patent No.: US 6,623,821 B1
(45) Date of Patent: Sep. 23, 2003

(54) HEAT-SHRINKABLE, HEAT-SEALABLE POLYESTER FILM FOR PACKAGING

(75) Inventor: Terrance D. Kendig, Newark, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/494,354

(22) Filed: Jan. 31, 2000

Related U.S. Application Data

(63) Continuation-in-part of application No. 09/105,558, filed on Jun. 26, 1998, now abandoned, which is a division of application No. 08/854,830, filed on May 12, 1997, now Pat. No. 5,873,218, which is a continuation-in-part of application No. 08/646,195, filed on May 7, 1996, now abandoned, which is a continuation-in-part of application No. 08/414,568, filed on Mar. 31, 1995, now abandoned.

(60) Provisional application No. 60/049,940, filed on Jun. 24, 1996.

(51) Int. Cl.[7] .................. B32B 15/08; B32B 27/36; B65B 53/02

(52) U.S. Cl. ............... 428/34.9; 428/35.3; 428/35.4; 428/458; 428/461; 428/480; 428/483; 428/518

(58) Field of Search .................. 428/35.2, 34.9, 428/35.4, 35.3, 518, 480, 483, 458, 461

(56) References Cited

U.S. PATENT DOCUMENTS

| | | | |
|---|---|---|---|
| 2,762,720 A | 9/1956 | Michel | |
| 2,876,067 A | 3/1959 | Nagel et al. | |
| 4,243,712 A | * 1/1981 | Hoheisel et al. | 138/118 |
| 4,274,900 A | 6/1981 | Mueller et al. | 156/229 |
| 4,971,845 A | 11/1990 | Aaker et al. | 428/34.9 |
| 5,079,051 A | * 1/1992 | Garland et al. | 156/244.11 |
| 5,296,170 A | 3/1994 | Sugimoto et al. | 264/448 |
| 5,336,549 A | * 8/1994 | Nishimoto et al. | 428/213 |
| 5,873,218 A | 2/1999 | Kendig | |

FOREIGN PATENT DOCUMENTS

| | | |
|---|---|---|
| CA | 2080317 | 4/1993 |
| EP | 0 536 673 B1 | 4/1993 |
| EP | 0 581 970 A1 | 2/1994 |
| EP | 0 780 857 A2 | 6/1997 |
| WO | WO 97/49609 | 12/1997 |

OTHER PUBLICATIONS

PCT International Search Report for International Application No. PCT/US01/03036, dated Jun. 26, 2001.

\* cited by examiner

*Primary Examiner*—Rena Dye

(57) ABSTRACT

The invention provides a packaging film comprising a heat-shrinkable, heat-sealable polyester shrink film. The film comprises a homopolymer or copolymer of polyethylene terephthalate, preferably coated with a solvent-based, heat-seal coating, e.g., an amorphous copolyester. The film may be metallized and/or laminated to other films, e.g., ionomer films. The films and laminated are useful in various packaging applications including cook-in or non-cook bags for packaging meats, as well as lidding applications

2 Claims, 2 Drawing Sheets

HEAT-SHRINKABLE, HEAT-SEALABLE POLYESTER FILM FOR PACKAGING

CROSS REFERENCE TO RELATED APPLICATION

This application is a continuation-in-part of prior application Ser. No. 09/105,558, filed Jun. 26, 1998, now abandoned, which was a division of patented prior application Ser. No. 08/854,830, filed May 12, 1997, U.S. Pat. No. 5,873,218, both entitled Packaging System Capable of Venting Steam While Remaining Tamper Resistant and Methods Relating Thereto, which was a continuation-in-part of prior application Ser. No. 08/646,195, filed May 7, 1996, now abandoned, which was a continuation-in-part of abandoned prior application Ser. No. 08/414,568, filed Mar. 31, 1995, now abandoned, and entitled Closed Container and Packaging Process which was a continuation-in-part of provisional application Ser. No. 60/049,940, filed Jun. 24, 1996, and entitled Packaging System Capable of Venting Steam While Remaining Tamper Resistant and Methods Relating Thereto.

BACKGROUND OF THE INVENTION

1. Field of the Invention

The present invention relates broadly to a particular type of polyester shrink film. More specifically, this invention relates to a heat-shrinkable polyethylene terephthalate film coated with a solvent-based heat-seal coating and/or laminated to other films, useful in packaging, e.g., as bags or lidding stock.

2. Discussion of the Related Art

The use of heat-shrinkable thermoplastic films is well-known to the packaging industry. For example, poultry products are typically sealed within bags made from such films, and heated, thus shrinking the bag until it fits tightly around the product. One such bag is monolayer polyester film. These bags provide strength and protection through tight adhesion to the product, though they have the drawback that they must be sealed with an adhesive since polyester is not heat-sealable except at exceptionally high temperatures. Bags sealed with adhesive are generally not as strong in the seal area as heat-sealed bags, and cannot be closed on the open end by existing heat-seal equipment.

Coextruded films, such as polyolefins, are useful in producing heat-shrinkable bags because they are heat-sealable and therefore can be produced on existing heat-seal equipment economically. They maintain good physical contact with a packaged product after heat shrinking, and thereby retain juices within packaged meats, but not as well as laminated shrink bags. However, coextruded film have have less desirable mechanical properties, such as tensile strength and modulus, and therefore bags from these films are more apt to tear or otherwise become physically damaged during handling. As well, they generally do not possess high temperature heat resistance, which limits their application for cook-in uses.

U.S. Pat. No. 4,971,845 discloses an oriented heat-sealable, heat-shrinkable adhesive laminated film comprising, in one instance, a polyester film layer and a polyolefin film layer, wherein said film layers comprise similar shrink characteristics. The one example discussed combines layers each having "approximately the same shrinking characteristics", i.e., a shrinkage of about 50%.

There exists a need for a thermoplastic film which has high-strength, is heat-shrinkable and heat-sealable, as well as high temperature heat resistant.

SUMMARY OF THE INVENTION

This invention provides a heat shrink film for packaging comprising:
(a) a heat shrink film comprising a polymer having at least 80% by weight polyethylene terephthalate polymer, wherein said film is biaxially oriented in the range of about 5% to about 55%, said film having an outer surface and an inner surface; and
(b) a solvent-based, heat-seal coating on at least one of the outer surface and inner surface.

This invention also provides a method to package an article, comprising the steps of:
(a) wrapping the article in a shrink film comprising a polymer having at least 80% by weight polyethylene terephthalate polymer, wherein said film is biaxially oriented in the range of about 5% to about 55%, said film having an outer surface and an inner surface, said inner surface having coated thereon a solvent-based, heat-seal coating;
(b) heat-sealing the required sides to form a bag;
(c) sealing the bag with the article therein; and
(d) shrinking the bag by applying heat.

This invention further provides a tamper-resistant packaging container capable of venting vapor comprising, in combination:
a) an open rigid or semi-rigid container having a floor portion and side walls upwardly extending therefrom, said side walls having an outside surface;
b) a heat-shrink film having an inner surface and a solvent-based heat seal coating applied on such inner surface, said inner surface of said film in intimate sealing contact with at least a portion of the outside surface of the side walls, and wherein the heat-shrink film comprises:
i) a polymer having at least 80% by weight polyethylene terephthalate polymer; and
ii) wherein said film is biaxially oriented in the range of about 5% to about 30%.

This invention includes a tamper-resistant heat-shrink lidding film, having an inner surface, for covering a rigid or semi-rigid container having an outside surface, said film comprising at least 80 percent by weight of a polyethylene terephthalate homopolymer or copolymer, having a plurality of sides and a thickness of 12–75 micrometers, and being biaxially oriented in the range of about 5%–30% shrink factor; and said inner surface comprising a solvent-based heat-seal coating thereon, wherein:
a) said film is intimate contact with at least a portion of the outside surface of said container;
b) when the sides of said film are heated, said film remains in tamper resistant engagement with said container, hermetically sealing said container, yet allowing air and moisture to move in and out of said lidding film upon heating.

This invention also provides an improved method for laminating PET film to other films, comprising the steps of:
(a) coating a solvent-based laminating adhesive to the PET film;
(b) heating to less than the shrink temperature to dry the adhesive;
(c) laminating the film to other films without requiring additional adhesive.

DETAILED DESCRIPTION OF THE PREFERRED EMBODIMENT(S)

Figure 1:
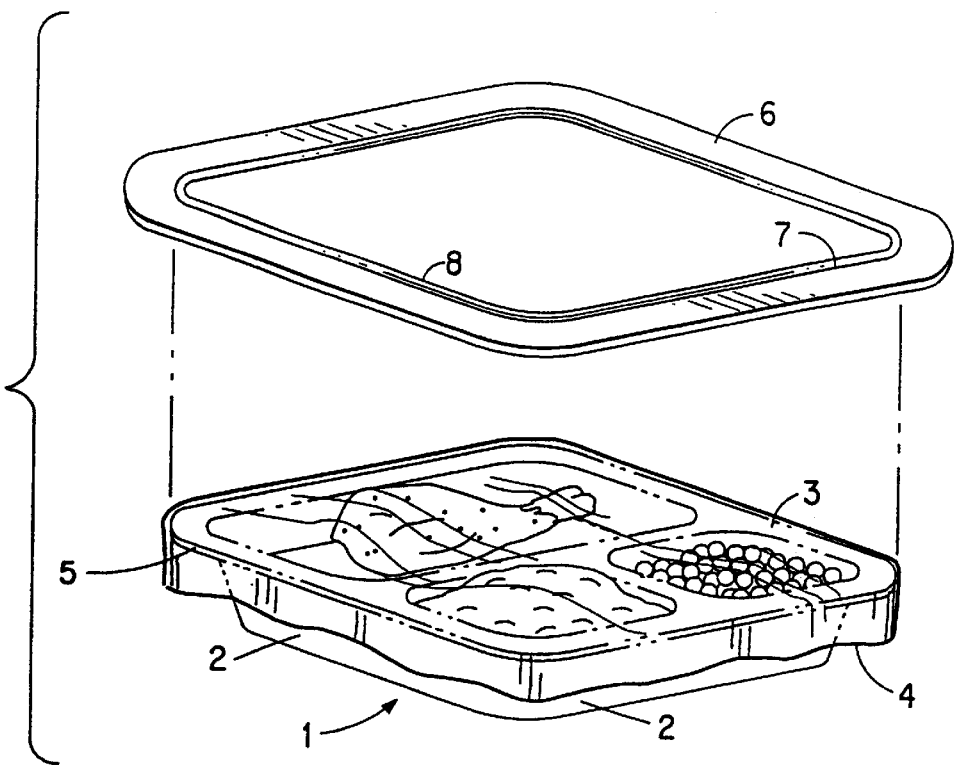
FIG. 1 is a perspective view of a container prepared in accordance with the present invention, prior to shrinking the sides of the film cover.

The present invention is directed to a particular type of polyethylene terephthalate ("PET") shrink film, and methods related thereto, that offers advantages in packaging for both non-cook and cook-in applications. The invention is based on the platform of a film of polyethylene terephthalate polymer, either homopolymer or copolymer, that is both heat-shrinkable and heat-sealable, typically thin-guage and having low shrinkage. The inventors have found a way to pre-apply a solvent-based, heat-seal coating to the film during manufacture of the film, thus avoiding the need for post-applied adhesives, which has conventionally been required to apply adhesive to low shrink temperature films.

This is a significant advance over the art, decreasing both the time and cost of making the film, as well as providing for use of the film in new applications. Conventional post-applied adhesives must be registered in areas to be sealed, and cannot be wound upon one another. They generally take 14 days to cure in air, thus limiting their applications. Typically they have been limited to making bagstock where film is sealed to itself. The invention herein allows sealant application across the entire web, thereby not limiting seal areas or configurations in which it can be used.

In addition to the ability to apply a solvent-based heat-seal coating to the base film, the invention herein also provides for the application of a metallized coating to the base film, and between the film and any solvent-based heat-seal coating, as well as the application of antifog and other agents.

Furthermore, the base film, with or without a solvent-based heat-seal coating, optionally metallized and/or coated with antifog agents, can be laminated to other polymer films to provide unique options and properties, of particular use in packaging applications, e.g., one-bag systems for packaging meats to replace the current two-bag packaging. Additional laminated layers could provide increased strength, barrier properties, printing surfaces, sealing characteristics, as well as decorative visual features when metallization is used.

Heat-Shrinkable, Heat-Sealable Base Film

The heat-shrinkable, heat-sealable PET shrink film, i.e. "base film" of the present invention comprises at least about 80 wt % PET, more preferably at least about 90 wt % PET. The PET can be a homopolymer or copolymer of PET. A PET homopolymer is intended to mean a polymer substantially derived from the polymerization of ethylene glycol with terephthalic acid, or alternatively, derived from the ester forming equivalents thereof (e.g., any reactants which can be polymerized to ultimately provide a polymer of polyethylene terephthalate). A copolymer of PET is intended to mean any polymer comprising (or derived from) at least about 50 mole percent ethylene terephthalate, and the remainder of the polymer being derived from monomers other than terephthalic acid and ethylene glycol (or their ester forming equivalents).

The PET base films of the present invention are further defined as:
1. being biaxially oriented in the range of about 5%–55% shrink factor, more preferably in the range of about 10–30% shrink factor; and
2. for lidding applications, having a thickness in the range of 12–75 micrometers (more preferably 12–20 micrometers).

Suitable polyethylene terephthalate shrink films are available from E. I. du Pont de Nemours and Company, Wilmington, Del. under the trademarks Mylar® and Mellinex®.

Relative to conventional shrink film, the shrink films of the present invention are advantageous in packaging applications for a number of reasons. The PET shrink film is tough relative to many conventional shrink films, and the film's relatively small amount of orientation ("low shrinkage") has been found to better accommodate protrusions, by not shrinking to such an extent as to risk puncturing the film or crushing protruding contents, and by not shrinking to such an extent as to agglomerate an ugly mass of shrunken film around the protrusion. As a lidding film, the thin gauging of the shrink film (in combination with the low shrinkage), causes the lidding film to tear when the package is opened, thereby creating tamper evidence. Conventional shrink films will generally shrink to a much greater film thickness, thereby providing a lidding which can be pulled off without tearing, thus leaving no tamper evidence.

When first shrunk to a package, the base film of the present invention forms a tight hermetic seal due to the presence of the adhesive coating. However, due to the thin gauging and low shrinkage, the seal will still become self venting when heated in an oven or the like. Conventional shrink films will either form a tight conforming seal or be self venting, but generally cannot do both. Per the invention herein, seals can be made to an outer wall, outer lip edge, top of the lip and bridges separating compartments to prevent spillage from one to the other. Another advantage is this type of construction can be used in Modified Atmospheric Packaging (MAP).

The relatively low shrink force films of the present invention also provide excellent appearance and are generally more economical to use than conventional (higher gauge, higher shrinking) shrink films, especially for lidding applications, because they minimize the amount of material needed for coverage of the product and container being used.

The heat shrinkable PET base film has other additional advantages. It can be surface printed or trap printed by itself or when laminating. It can be laminated, carrying varying degrees of shrink % 5–45, to materials used for cook in processes. Both laminated and heat sealable versions can be used as heat shrinkable lidstocks. Both versions can be used to package materials other than foodstuffs Application of Heat-Seal Coating Applicants have identified a method to impart adhesive to the base film that avoids time-consuming or difficult post-processing. Surprisingly the applicants use a solvent-based heat-seal coating which has typically been considered impossible given the low shrink-initiation temperature of the base film, typically about 80° C. The heat-sealant material itself is preferably a copolyester or ethylene vinyl acetate copolymer (EVA), more preferably an amorphous copolyester. It is contemplated that other sealants known to those of skill in the art could also be used.

The more preferred copolyester heat-sealant is derived from at least the following components: about 10 to about 60 mole % terephthalic acid ("Monomer A"); about 10 to about 60 mole 5 ethylene glycol ("Monomer B"); and about 5 to about 60 mole 5 of a third monomer being a secondary di-acid ("Monomer C") and/or a secondary diol ("Monomer D").

Examples of Monomer C include: succinic acid, adipic acid, azelaic acid, sebacic acid, 1,10-decanedicarboxylic acid, phthalic acid, isophthalic acid, dodecanedioic acid, and the like. Examples of Monomer D include: methoxypolyalkylene glycol, neopentyl glycol, propylene glycol, 1,4-butane diol, trimethylene glycol, hexamethylene glycol, tetramethylene glycol, diethylene glycol, and the like. Preferred such comonomers include azelaic, sebacic, and/or isophthalic acid.

The adhesive is applied as a solution. The key factors that allow the solvent-based heat-seal coating of the heat shrinkable PET base film are a) the proper choice of solvent(s) (e.g., preferably tetrahydrofuran) for the adhesive so that drying can be achieved at temperatures less than 80 degrees C., and (2) the use of lower than normal film winding tensions during processing.

The solvent-based, heat-seal coating can be applied to one-side (or two-sides) of the heat shrinkable PET base sheet by means of any of the many coating techniques known to those of skill in the art. For example, the film may be coated by roller (e.g. doctor roll) coating, spray coating, gravure coating, or slot coating, preferably roller or gravure coating using a solution coating process.

Specifically the conditions given below are critical due to the fact the film is very unstable and will shrink prematurely when exposed to elevated temperatures and will stretch when wound too tightly.

Drying temperatures (degree C.): approximately 70–75
Film Windup Tensions (pli): approx. –0.25–1.0
Coating/Windup Speed (ypm): approx. 100–500
Coating Weight (gms/m2): approx. 1.0–10

The resultant heat-sealable, heat shrinkable, PET film exhibits heat seal strengths greater than 260 g/in, coating weights of about 1 to about 10 g/m$^2$, preferably about 1.5 to about 2.5 g/m$^2$, and film shrinkage at 100 degrees C. of about 5% to about 55%, preferably about 10% to about 30%.

Application of Metallized Layer and Other Additives

The solvent-based heat-seal coating described above provides a heat-sealable surface to the heat shrinkable PET base film. An additional metalllized layer can provide oxygen and moisture barriers, as well as a decorative feature to the film.

The described heat-shrinkable PET base film, having an outer surface and inner surface, may be coated on one or both surfaces with a metal layer. The solvent-based, heat-seal coating may be coated on top of the metal layer. The heat shrinkable PET base film can be two-side heat-seal coated or two-side aluminum-metallized in any combination.

The metal used can vary, though aluminum is preferred. The metal layer may be applied to the heat shrinkable PET base film by known methods, e.g., by the standard vacuum deposition processes.

For the aluminized layer, the key conditions are
Optical Density (heavy metal deposition): approx. 0.75 to 4; preferably 2.6–3.0
Optical Density (light metal deposition): approx. 0.25+/–10%

Optical density was measured using a digital-readout, transmission densitometer, equipped with four selectable filters for color and visual-density measurements within a range of 0 to 4.0. The measurements indicate American Standard (ANSI) opal-glass, diffuse visual transmission density.

In addition to one or more metallized layers, other components may be coated on the base film to impart other desired properties. For example, an anti-fog agent or slip agent may be incorporated into the solvent-based, heat-seal coating prior to applying on the shrink film, to impart anti-fog or anti-slip properties. Other additives typically used in the industry may be incorporated in a similar fashion.

Laminating to Other Films

The heat-shrinkable PET base film can also be adhesive laminated to other materials to enhance performance of the overall structure, depending on the packaging need. The shrinkable base to be used can be plain uncoated, solvent-based heat-seal coated, and/or metallized. The other materials useful in the laminates will vary greatly depending on the properties sought, but will include nylon, polypropylene, polyethylene, ionomer, ACR, ethylene vinyl acetate (EVA), polyethylene terephthalate (PET), polystyrene, ethylene vinyl alcohol (EVOH), polyvinylidene chloride (PVDC), and combinations thereof.

For example, uncoated base film can be laminated to an ionomer film, as well as one-side metallized variety. Typically the PET base films have an approximate shrinkage of 20% in both the MD/TD directions. A two part polyester urethane adhesive can be applied to the heat shrinkable PET via a gravure cylinder to serve as the laminating adhesive. The laminating adhesive is applied across the web, from solution.

The shrinkage of the PET base film and the additional films to be laminated need not be similar; in fact shrinkage differences of about 5% and much greater pose no problem. The amount of shrinkage will be dictated by the heat-shrinkable PET base, but just as important by the thickness and stiffness of the secondary web. An example would be when adhesive laminating to a thicker or stiffer substrate, in order to gain the shrinkage desired from the laminate, a higher percentage of shrinkage may be required of the PET base sheet. It is again very important to choose an solvent-based laminating adhesive in which the dilutent solvent used as well as the adhesive can be dried below 80 C. This is due to the heat sensitivity of the heat shrinkable PET for prevention of premature shrinkage of the film before lamination to the secondary web.

It is recommended to corona treat both web surfaces that will be in contact with the applied adhesive. If no heat-sealant is applied to the base film, then a secondary structure, such as an ionomer film or a multilayer coextruded film, can serve as the heat-seal layer for the resulting laminate, also providing added puncture resistance and formability. Such a laninated film will have unique applications in packaging, e.g., the ability to provide a one-bag system for packaging meats where previously a two-bag system has been used before. Such two-bag systems typically used an olefin or nylon bag to package meat or poultry to hold the juices close to the product, and then place the package in a second non-shrink metallized bag for added barrier protection and decoration.

The invention herein provides for a one-bag system which can both retain juices and provide barrier and decorative properties—and provide greater economic benefit due to reducing the materials and labor of double-bagging. The metallized version provides a high oxygen/moisture barrier plus a decorative feature when fabricated into a bag or lidstock. The decorative feature is a "pearl-essence", which occurs as the metal layer is deformed by the shrinkage upon packaging, but still retains excellent barrier.

The laminating adhesive can be applied by any of the well known coating techniques mentioned above, preferably roller or gravure coating using a solution coating process. The types of adhesive that are useful in making the laminates herein are those typically used in the industry, though the right combination of adhesive and solvent choice are critical due to the sensitivity of the shrinkable base to heat.

Again, similar to the application of the solvent-based, heat-seal adhesive coating, the significant operating conditions for the coating process that allow the urethane adhesive coating of the heat shrinkable base film are a) the proper choice of solvent(s) (e.g. isopropanol or ethyl acetate) so that drying can be achieved at less than 80 degrees C. and b) the use of a hot nip roll to mate the heat shrinkable web and the secondary ionomer web together activating the adhesive at below 80 C without inducing premature shrinkage of the heat shrinkable PET base. The same requirements need to be followed when laminating the heat shrinkable PET base to other substrates or films.

Approximate Resultant Properties of the Laminate Structures

Adhesion strength between laminated film layers: >300 gms/in

Film shrinkage @ 100 C (%): 5–45 with 10–30 preferred

Barrier before shrinkage OTR cc/100 in2/24 hr: 0.10/after shrinkage 0.2–0.5

Barrier before shrinkage for the metallized version of the laminate, WVTR gm/100 in2/24 hr: 0.05/after shrinkage 0.25–0.35

Note: Effect on barrier properties is dictated by how the much the metal is deformed through the shrinkage stage. Even when full 20% MD/TD shrinkage has taken place the barrier is still functional and never went over 0.5 OTR/WVTR.

Use in Packaging Generally

In use, the film can be used in a myriad of application. For lidding, the film is cut to size, and draped over a tray to be lidded. The film is then held in place by a mechanical device, vacuum or the like. Heat is then applied to the sides of the package, thereby causing the film to shrink around the perimeter of the package. Thereafter, the film can be shrunk along its center portion to further tighten the film and eliminate wrinkles or the like.

For other applications, the film may be presealed to form open bags, which may then be filled with contents in an in-line packaging machine. The bags are then sealed, and heated to shrink the bag around the contents. Such bags are ovenable, and may become self-venting once the internal temperature and pressure reach the softening point of the sealant.

For lidding the films of the present invention are well suited because the film, once shrunk, is substantially non-elastomeric. Also, the film can be hermetically sealed to the container. This is important for modified atmosphere packaging (MAP) and applications requiring hermetic sealing to the tray and between compartments. This prevents spillage during handling and distribution. In addition, the package is designed to become self-venting once the internal temperature and pressure reach the softening point of the sealant. The sealant is purposely designed to fail during those conditions. Even after sealant failure, the package still remains tamper evident due to the construction of the lidstock to the container.

The heat-shrinkable, heat-sealable base film is recommended when lidding disposable containers, particularly trays made of crystalline PET (CPET), amorphous PET (APET), paper, aluminum, polypropylene (PP), polethylene (PE), polyvinyl chloride (PVC), polvinylidene chloride (PVDC) or polystyrene (PS).

The films of the present invention also provide a relatively small amount of shrinkage, relative to conventional shrink films, while still providing the sealing advantages of a shrink film. This makes the film simple and easy to use.

Use of Film in Lidding Applications

The present invention is also applicable to the sealing/lidding of containers for foodstuffs, including rigid (reusable) and semi-rigid (disposable) containers.

A preferred container construction comprises a wall which extends away from the center of the tray. The wall design can vary widely, but should be sufficient to retain the heat shrinkable film on the sides of the container, when the film on top of the container is being shrunk (first along the sides, then on top).

The shrink films of the present invention preferably have an orientation in each direction in the range of about 5% to about 30%, more preferably from about 10–20%. Many commercially available heat shrinkable polyethylene terephthalate films have an orientation from about 40 to 50% or more, and such shrink films would be unsuitable for use as lidding in the present invention. Less shrinkage is preferred because higher shrinkage will deform less rigid materials when applied to the tray, and also during the reheat and/or cook cycles.

The thickness of the covering film is preferably in the range of about 12–75 micrometers, more preferably about 12–20 micrometers. Suitable polyethylene terephthalate shrink films are available from E. I. du Pont de Nemours and Company under the trademark Mylar® LD for lidding applications.

In use, the heat-shrinkable film is placed over the top of the container. Sufficient draping or overlap of the heat-shrinkable film should be provided to anchor the film after shrinking below the top surface of the container. The maximum overlap is not critical, so long as the overlap does not substantially exceed the depth of the sides of the container after shrinkage. The size of the film before shrinkage can be adjusted, according to the known shrink characteristics of the film. In general, a final overlap of about from 1 to 7 centimeters is satisfactory.

Preferably, the film is then restrained on the container. The film can be restrained on the top alone, as with a platen, or on the sides, or both. The restraining mechanism can vary widely and can include, for example, positive air pressure, vacuum, mechanical fingers or gasketing. Rubber gasketing, particularly silicone rubber, has been found to be particularly satisfactory for restraining the sides. The gasketing can be fastened to the inside of a frame or plate having an aperture formed therein which can pass over the top surface of the container.

While the film is restrained on the container, the film is heated to a temperature above the shrinkage/sealing temperature and below the melting temperature of the heat shrinkable film. The heating means can vary widely, and can include, for example, heated fluid or radiant heat. The film is preferably heated by the use of a heated fluid. This fluid can for example, be water or gas, air being preferred for convenience and economy. In any case, the fluid should be heated to above the shrinkage temperature of the heat-shrinkable film.

Preferably, the film is heat shrunk along the sides of the container, prior to heat shrinking/sealing the film along the top of the container. In this way, the film along the sides will shrink and form a hermetic seal around the edge of the container. Hot fluid temperature needs to be above the shrinkage point of the film as well as above the softening point of the sealant so as the film shrinks the heat sealant is activated and is pulled and sealed against an outer portion of the container forming a hermetic seal. Any outer portion as well as the top can be hermetically sealed if so desired.

The top portion of the film can then be heat shrunk, thereby removing any wrinkles and providing a neat, taut lidding surface along the top of the container. Such sequential shrinking of the film can be accomplished by protecting the top surface of the container with a platen, while the sides are exposed to either heated fluid or a shrink tunnel; the platen can then be removed, allowing the top portion of the film to then be heat shrunk.

The heated fluid can be generated in an number of conventional or non conventional ways. For example, conventional air heat guns can be used to heat the film, and the air temperature can be controlled by resistance temperature detectors (RTDs) incorporated into the heat gun. Circumferential or perimetric tubes can be used to direct the heated air along the sides of the container. The heated air flow can also be used to restrain the film by impinging upon the film along the sides of the container. In such an embodiment, perimetric tubing can be made to conform to the shape of the container, and fitted to receive a heat gun.

The heating mechanism can vary widely, depending upon the size of the container and the desired speed of operation. A 220 voltage, 2000 watt heat gun has been found to generate adequate flow of heated fluid for average sized food containers to be packaged in accordance with the present invention. The heat gun can be controlled by a PID microprocessor temperature controller and an RTD (resistance temperature detector) sensing device. The RTD changes electrical resistance with changes in temperature and can thereby signal the temperature controller to adjust the electrical current, as needed for maintaining a constant temperature.

The precise nozzle location for the heated air can be adjusted to the particular configuration of the container being covered. For example, the hot air pipe can be above the top of the container with the nozzles directed to a point below the top of the container, thereby shrinking the draped and restrained film along the sides of the container.

The temperature for heat shrinking the material across the top can similarly vary widely, and (as with the shrinkage of the film along the sides of the package) will be above the shrinking temperature of the film, but below its melting temperature. Fluid temperatures above the melting temperatures of the film and heat seal coating can be used to shrink and seal the film to the container provided appropriate adjustment to the exposure time is made, so the film does not melt. Similarly, the shrinking of the top of the film can be accomplished with a heated air gun, fitted with a nozzle appropriate to the size and shape of the package being treated.

The heat shrinkable film to be used is generally cut to a size that will overlap or drape over the top of the container to be lidded by at least about 1 centimeter on each side of the container after shrinkage. Depending on the sequence of shrinkage, and the particular apparatus used, the heat-shrinkable/heat-sealable film can be cut to size before heat-shrinking/heat-sealing, simultaneous with heat-shrinking/heat-sealing, or after heat-shrinking/heat-sealing.

The present invention will be further understood by reference to the drawings, in which FIG. 1 is a perspective view of a container 1 having side walls 2. In the embodiment shown in the Figures, side walls 2 are provided with outwardly turned flanges 3. Although a flanged tray such as is shown is preferred, it is to be understood that the invention is not limited to the use of such a tray. The container is subdivided, for example, for various portions of foods. A heat-shrinkable, heat-sealable film 4 is cut to a size greater than the outer dimensions of the container top. The film is retained below the top of the container along container sides 5 by frame 6 having interior edge 7 to which gasket 8 is attached. The inner edge of the gasket is somewhat smaller than the outer perimeter of the container top, to permit the frame with the gasket to be installed over the top of the container. Heated fluid, such as air, can be directed to the film edge below the perimeter of the container top, thus shrinking/sealing the film and anchoring the film over the container.

Figure 2:
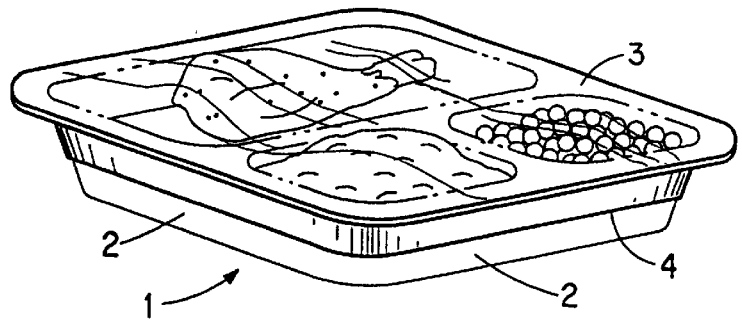
FIG. 2 is a perspective view of a container prepared in accordance with the present invention after shrinking the sides of the film cover, and before shrinking the top of the cover.
Figure 3:
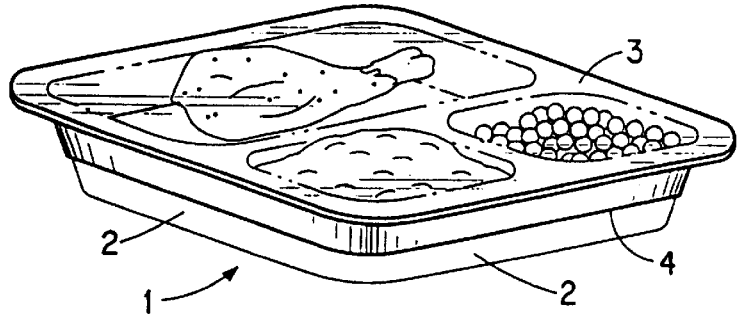
FIG. 3 is a perspective view of a sealed container prepared using the present invention.

FIG. 2 illustrates the container after heat shrinking the sides of the film, in which the shrunk film is sealed to the side walls 2 of the container. At this point, heated fluid can be applied to the film on the top of the container, shrinking that portion and resulting in a hermetically sealed package as shown in FIG. 3.

With sequential shrinking of the film, the restraining means is typically removed prior to shrinking the film on the top of the container.

While a sequential shrinking of the film around the package is possible, as described above, the entire film can be shrunk simultaneously with an appropriately sized platen for the heated fluid.

Figure 4:
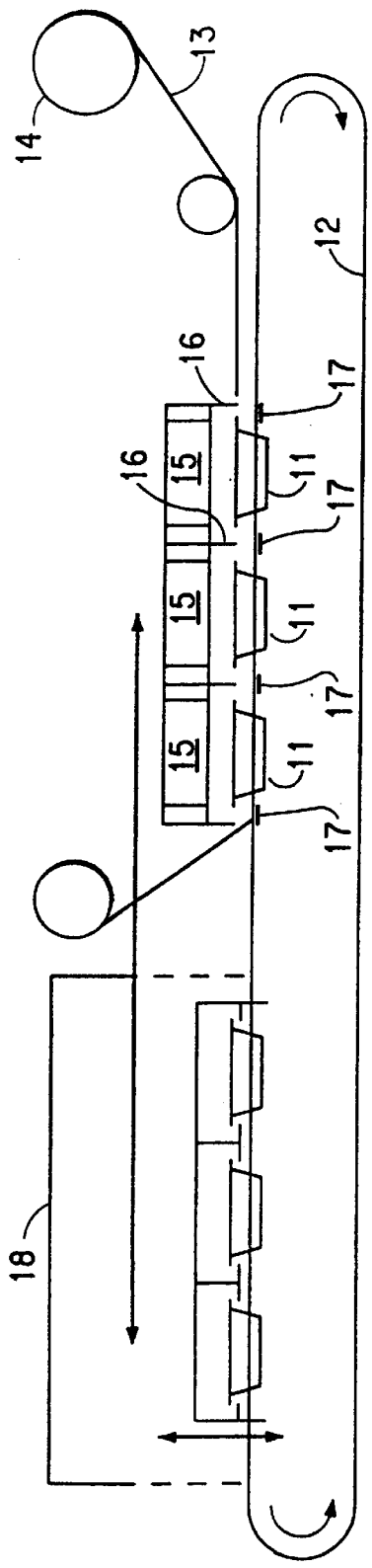
FIGS. 4 and 5 are schematic cross-sectional views of an apparatus in accordance with the present invention.
Figure 5:
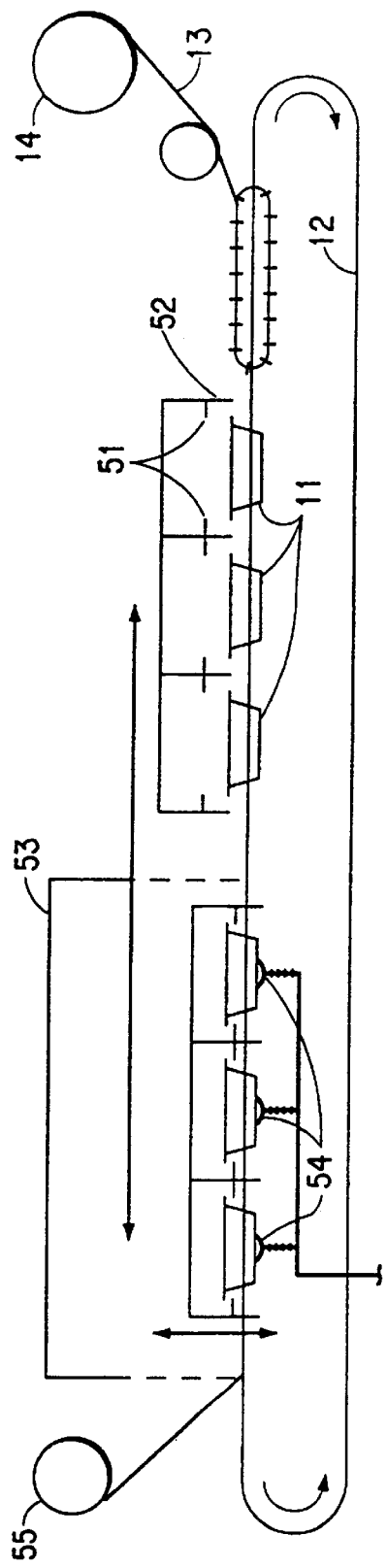

FIGS. 4 and 5 are schematic illustrations of representative apparatus that can be used in accordance with the present invention.

In FIG. 4, trays 11, positioned on conveyor 12, are capped with film 13 supplied by roll 14. The film is held in place on top of each of the containers by platens 15 and the edges of the film cut by die-cutters 16. The sides of the film are then shrunk using hot air through heat guns 17. Hereafter, the trays are moved into a shrink tunnel 18, in which the tops of the containers are shrunk.

An alternative apparatus which can be used in accordance with the present invention is shown in FIG. 5. There, trays 11, on conveyor 12, are similarly capped with film 13 supplied from roll 14. However, the edges of the film are held in place around the tops of the containers by tucking means 51, and die-cut by blades 52. With the sides thus restrained, the trays with the tucking or restraining devices in place are moved to shrink tunnel 53, where they are held in place by vacuum holding devices 54, applied to the bottom of each container. In this apparatus the heat-shrinkable/heat-sealable films on the side and the tops of the containers are shrunk/sealed simultaneously in the shrink tunnel. Waste heat-shrinkable, heat-sealable film is rewound on roll 55.

The heat-shrunk, heat-sealed polymeric film can be readily removed from the sides and top of the container, by removing with an exposed edge or tearing the top. An appropriate notch, tear tab or peel tab can also be provided as desired.

While the cover hinders tampering of the food, being hermetically sealed across and between top compartments, it also prevents spillage from one compartment to the other during transport or display of the product. Yet while cooking or reheating the sealant is designed to fail and the package becomes self-venting, otherwise prohibiting escape of expanding gases within.

The present invention is further illustrated by the following examples.

EXAMPLES 1–2

A rectilinear molded container for foodstuffs having approximate dimensions of 6¼" by 8½" by 2" (15.9 cm by 21.6 cm by 5.1 cm) deep is lidded using heat-shrinkable, heat-sealable polyethylene terephthalate films having a thickness of about 19 microns, and a shrinkage of 20% and 9%. Each film is cut to a size relative to the shrink % in each dimension of the top surface on each side of the container. The film is held in place below the flange by a frame having a gasket on the inner surface of the frame.

The trays contain a wooden block with two nails protruding about 2.6 centimeters above the tray flange to simulate sharp-edged package contents. The first tray is lidded with a shrink film biaxially oriented about 20%, and the second tray is lidded with film biaxially oriented about 9%. The film is first shrunk around the sides by the application of air through a nozzle, is heated to a temperature above the shrink temperature of the film and below its melting temperature, after which the restraining gasket is removed. Thereafter, the film on the top of the container is shrunk with the same air source by consecutive passes of the nozzle over the top of the film. After lidding film application and placement in a 350° F. (177° C.) oven for about 20 minutes, no film punctures would be expected, though the film remains hermetically sealed around the entire tray flange.

EXAMPLES 3–5

EXAMPLE 3

Cook-In Bags

The copolyester coated heat sealable/heat shrinkable base can be formed into a bag stock for cooking or re-heating various meats and or vegetables in a microwave or conventional oven. Both the heat shrinkable PET base film and sealant are FDA approved for temperatures up to 204 C. For example, a bag using the described base film can be formed by known bag making techniques. By heat sealing the copolyester sealant to itself or if desired to the plain PET base.

In the test case heat seals were made sealant to sealant using a one-inch heat seal bar to form a bag with three outer edge seals leaving one end open. Two fully seasoned, whole six pound chickens were then loaded into separate bags and heat sealed in the same way as the other three seals closing the bags. The sealing temperature was 150 C, 30 psi and 0.5 second dwell. The recommended temperature window for sealing a copolyester sealant of this type can be in the range of 93 C to 204 C dependent on the equipment used or the sealing process. One of the sealed bags was placed in an electric oven and the other in a gas oven. Both ovens were set to a cooking temperature of 177 C.

No vent holes were placed in the bags as recommended with other cook in bags. These type bags are generally made from uncoated nylon or polyester and also require clips or ties for closure. As the internal contents begin to reach elevated temperatures the bag begins to balloon from the steam pressure generated within the bag. When internal temperature reaches the softening point of the sealant, which hold the heat-seals together, the seal will fail at its weakest point and allow a self-venting process. The benefits of self venting are 1) the allowance of an oxygen exchange thus helping to promote a desired browning effect on the contents 2) and also keeps moisture entrapped allowing the foodstuff to cook in it's own juices keeping it moist and flavorful.

After two hours both bags were removed. The result was the chicken was very moist and flavorful with the meat falling from the bone upon removal from the bag.

EXAMPLE 4

Container/Lidding Application

The heat sealable/heat shrinkable PET film in the new invention can be used in the same manner and provides all the benefits as described in U.S. Pat. No. 5,873,218. The major difference being that a hermetic heat seal can be made with the copolyester sealant to the outer lip of the container in addition to shrinking around and under the lip itself. An additional benefit over the existing invention is containers which are separated by bridges that form separate compartments can be sealed totally across those bridge areas thus eliminating spillage not only around the outer edge but from one compartment to another during distribution.

For example, the film of the present invention was precut to size, (draped over the opening and) draped over the outer wall(s) of the container by a ratio relative to the shrinkage. The film is then held in place as described in the referenced invention. Heat is then applied to the container sides causing the film to shrink around the tray perimeter. This securely anchors the film to the container and also activates the heat seal layer forming a hermetic seal to the outward lip. This method also applies to a container having a sloped side wall(s) with no outer lip. By heating the film above the sealant melt point but below the melt point of the film, combined with the pressure generated by film shrinkage is enough to bond the film to the container. The type of package construction disclosed can be used for products which are cooked or re-heated creating a tamper evident, dual ovenable self-venting package or products requiring a tamper evident feature that are not meant for exposure to elevated temperatures.

EXAMPLE 5

Lamination

The laminated version of the heat shrinkable PET base film in the invention herein, as described above, can also be formed into a bag material. In cases where shrinkage, puncture, flex crack resistance, metallization for barrier or decoration and heat resistance may be desired. Any number of combinations can be fabricated from the materials mentioned based on the application need. For example, a bag was fabricated out of the following laminate structure out to in:

Heat shrinkable (0.5 mil)(20% MD/TD) PET base/aluminum/adh/ionomer sealant layer (2 mil).

A bag was fabricated by taking a length of film and folding the sealant layers on to one another and heat sealing them creating two side seals and leaving the top open. Two cooked cuts of meat were packaged in two separate bags. A turkey breast and a ham each with a weight of approximately 4–6 pounds were used in the test. The bag has to be made larger than the contents to compensate for the shrinkage factor but not so much where the bag cannot be shrunk tightly around the contents. Each package was individually placed in a vacuum chamber to remove the oxygen and sealed. The packages were then removed and exposed to hot air above the shrinkage temperature but below the melting point of the film. The film shrunk tightly, conforming around and picking up the texture of the contents.

The advantages of this type of construction and process are 1) The metallization not only serves as a barrier adding shelf life, but also provides the function of decoration 2) The shrinkage factor eliminates the exposed edges by conforming to the package and also brings out the surface texture of the product packaged. Also by eliminating exposed edges the chance of puncture to other packages is reduced. 3) The decorative function can be enhanced through shrinkage. As the film structure shrinks, the metal deforms and takes on a pearl essence effect. This effect can be controlled by the amount shrinkage built into the structure.

EXAMPLES 6–13

Heat Seal Strengths

Heat-shrinkable copolyester film (50 guage Mylar® film, available from DuPont, Wilmington Del.) was coated with solvent-based amorphous copolyester adhesive. The coated film was sealed to itself, as well as to semi-rigid substrates, i.e., trays, made from PVC, amorphous PET and crystalline PET, at temperatures of both 250° F. and 300° F. Heat seal strengths were measured for each, as well as after aging 3 days at 32° F., and after aging 3 days at 0° F.

As well, the heat-shrinkable copolyester film was also first metallized and then coated with the solvent-based amorphous copolyester adhesive. Again the film was sealed to itself, as well as to semi-rigid substrates, i.e., trays, made from PVC, amorphous PET and crystalline PET PET, at temperatures of both 250° F. and 300° F. Heat seal strengths were measured for each, as well as after aging 3 days at 32° F., and after aging 3 days at 0° F.

The heat seal strengths were measured on 1 inch wide samples in triplicate. The seal strength is measured by peeling the seals apart in the machine direction (MD) using the Instron. The heat seal strength is the maximum force required to cause the seal to fail to read from the appropriate scale of the tester, and is measured in grams/inch width.

the Instron, one week aging at 72° F., 50% relative humidity, and samples were one inch (2.54 cm) strips.

TABLE 2

| Laminated Bond Strength | | |
|---|---|---|
| Specimen No. | Grams per inch | Failure |
| Plain Heat Shrinkable PET Base | | |
| 14 | 458 | Zipper Peel |
| 15 | 470 | Zipper Peel |
| 16 | 448 | Zipper Peel |
| 17 | 450 | Zipper Peel |
| 18 | 449 | Zipper Peel |
| Avg. | 455 | |
| Metallized Heat shrinkable Base | | |
| 19 | 174 | Peel |
| 20 | 210 | Peel |
| 21 | 158 | Peel |
| 22 | 221 | Peel |
| 23 | 37 | Peel |
| Avg. | 160 | |

Note: Failure is a result of metal adhesion to the base sheet

EXAMPLES 24–31

Shrinkage Measurements for Films and Laminates

The shrinkage was measured for samples of various films and laminates. The measurements were made in triplicate for

TABLE 1

HEAT SEAL STRENGTHS
Method & Conditions: CR-188 @ 12" per min/0.50 sec dwell/20 psi     1" Strips

| | Seals aged 24 hrs @ 72 F./50% R.H. | | | | Seals aged 3 days @ 32 F. | | | |
|---|---|---|---|---|---|---|---|---|
| Temperature | 250 F. | Failure | 300 F. | Failure | 250 F. | Failure | 300 F. | Failure |
| Amorphous Copolyester Coated | | | | | | | | |
| Ex. 6 — Coated to Coated | 987 | Peel | 960 | Peel | 647 | Peel/Tear | 792 | P/T |
| Ex. 7 — Coated to PVC | 616 | Peel/Tear | 671 | Peel | 817 | Break | 1237 | Break |
| Ex. 8 — Coated to APET | 664 | Peel | 788 | Peel | 460 | Peel/Tear | 926 | Break |
| Ex. 9 — Coated to CPET | 477 | Peel | 668 | Peel/Tear | 569 | Peel/Tear | 605 | P/T |
| Amorphous Copolyester Coated Over Metal | | | | | | | | |
| Ex. 10 — Coated to Coated | 797 | Peel/Tear | 848 | Peel/Tear | 456 | Break | 906 | P/T |
| Ex. 11 — Coated to PVC | 446 | Peel | 510 | Peel/Tear | 702 | Peel/Tear | 862 | P/T |
| Ex. 12 — Coated to APET | 565 | Peel | 844 | Peel | 685 | Peel | 980 | P/T |
| Ex. 13 — Coated to CPET | 397 | Peel | 586 | Peel | 690 | Peel | 871 | Peel |

Explanation of failure mode
Peel — Film peels cleanly away from substrate
Peel/Tear (P/T) — Film peels some and then tears
Break — Seal strength is stronger than the film causing a clean break at seal interface.

EXAMPLES 14–23

Properties of Laminated Heat-Shrinkable PET Base Film/Ionomer Film

Heat-shrinkable, heat-sealable PET base film (Mylar® film having approximately 20% shrinkage) was laminated to a 2 mil ionomer film (Surlyn® 1601 ionomer film, available from DuPont, Wilmington Del.) using a two-part polyester urethane adhesive. The bond strength was measured using a method similar to the above for heat-seal strength measurements. The conditions were 12 inches per minute speed on each specific sample. The test method generally involved placing a 5 inch by 5 inch samples in a heated bath of boiling water. The samples were secured between clamped screens and placed in the bath for 5 seconds. The length of the cooled sample was measured in both the machine direction (MD) and transverse direction (TD) and the shrinkage calculated as indicated.

The data clearly indicate that the heat-shrinkable polyester film is controlling the amount of shrinkage for the laminates and coated films.

TABLE 3

Dimension Change: Shrinkage

| | | % Change |
|---|---|---|
| 24) 0.5 mil Heat Shrink PET (20% MD/TD)/Metal/adh/2 mil Ionomer | MD | −21.5 |
| 25) 0.5 mil Heat Shrink PET (20% MD/TD)/Metal/adh/2 mil Ionomer | TD | −17.5 |
| 26) 0.65 mil Heat Shrink PET (45% MD/TD)/adh/2 mil Ionomer | MD | −40.5 |
| 27) 0.65 mil Heat Shrink PET (45% MD/TD)/adh/2 mil Ionomer | TD | −38.5 |
| 28) 0.50 mil Heat Shrink PET (20% MD/TD)/Copolyester Coated | MD | −18.85 |
| 29) 0.50 mil Heat Shrink PET (20% MD/TD)/Copolyester Coated | TD | −19 |
| 30) 0.50 mil Heat Shrink PET (20% MD/TD)/Metal/Copolyester Coated | MD | −18.2 |
| 31) 0.50 mil Heat Shrink PET (20% MD/TD)/Metal/Copolyester Coated | TD | −19.5 |

EXAMPLES 32–33

Barrier Data

The barrier properties for heat-shrinkable, heat-sealable, metallized film and the same laminated to ionomer film were tested using the following test methods:

ASTM D3985 at 72° F., oxygen test method; and

ASTM F1249 at 38° C., 90% relative humidity for water vapor test method.

TABLE 4

Barrier Data

| | | cc/100 in 2/24 hrs OTR | g/100 in 2/24 hrs $H_2O$ |
|---|---|---|---|
| 32) Heat Shrinkable Metallized | | | |
| 20% MD/TD | Before Shrinkage | 0.0175 | 0.0777 |
| | After Shrinkage | 0.11 | 0.315 |
| 33) Heat Shrinkable Metallized Laminated | | | |
| 20% MD/TD | Before Shrinkage | 0.115 | 0.0717 |
| | After Shrinkage | 0.434 | 0.296 |

What is claimed is:

1. A package formed from a heat shrink film wherein the heat shrink film comprises: a polymer film having at least 80% by weight polyethylene terephthalate polymer, wherein said polymer film is biaxially oriented in the range of about 5% to about 55% and said polymer film having an outer surface and an inner surface and further wherein the heat shrink film additionally comprises a metallized layer on the inner surface of said polymer film and a solvent-based, heat-seal coating on the metallized layer, and wherein the package after heat film shrinkage exhibits the property of pearlessence while the functional barrier to oxygen and moisture is retained.

2. A package formed from a heat shrink film wherein the heat shrink film comprises: a polymer film having at least 80% by weight polyethylene terephthalate polymer, wherein said polymer film is biaxially oriented in the range of about 5% to about 55% and said polymer film having an outer surface and an inner surface and further wherein the heat shrink film additionally comprises a metallized layer between the inner surface of said polymer film and a solvent-based, heat-seal coating.

* * * * *